(12) United States Patent
Kacholia et al.

(10) Patent No.: US 8,171,020 B1
(45) Date of Patent: May 1, 2012

(54) SPAM DETECTION FOR USER-GENERATED MULTIMEDIA ITEMS BASED ON APPEARANCE IN POPULAR QUERIES

(75) Inventors: Varun Kacholia, Mountain View, CA (US); Ashutosh Garg, Sunnyvale, CA (US); David Stoutamire, Redwood City, CA (US)

(73) Assignee: Google Inc., Mountain View, CA (US)

( * ) Notice: Subject to any disclaimer, the term of this patent is extended or adjusted under 35 U.S.C. 154(b) by 551 days.

(21) Appl. No.: 12/059,143

(22) Filed: Mar. 31, 2008

(51) Int. Cl.
*G06F 17/30* (2006.01)

(52) U.S. Cl. ........................................ 707/722; 707/758

(58) Field of Classification Search .................. 707/722, 707/758
See application file for complete search history.

(56) References Cited

U.S. PATENT DOCUMENTS

| | | | |
|---|---|---|---|
| 6,078,866 A * | 6/2000 | Buck et al. ........................ 702/2 |
| 6,442,606 B1 | 8/2002 | Subbaroyan et al. |
| 7,016,939 B1 | 3/2006 | Rothwell et al. |
| 7,124,149 B2 | 10/2006 | Smith et al. |
| 7,392,262 B1 | 6/2008 | Alspector et al. |
| 7,624,274 B1 | 11/2009 | Alspector et al. |
| 2004/0148330 A1 * | 7/2004 | Alspector et al. ............. 709/200 |
| 2005/0060643 A1 | 3/2005 | Glass et al. |
| 2005/0071741 A1 | 3/2005 | Acharya et al. |
| 2005/0188023 A1 * | 8/2005 | Doan et al. ..................... 709/206 |
| 2006/0168032 A1 | 7/2006 | Cai et al. |
| 2006/0184500 A1 | 8/2006 | Najork et al. |
| 2006/0294155 A1 * | 12/2006 | Patterson ....................... 707/200 |
| 2007/0043707 A1 | 2/2007 | Kulkarni et al. |
| 2007/0129997 A1 * | 6/2007 | Davies ............................ 705/14 |
| 2007/0179943 A1 | 8/2007 | Hegerty et al. |
| 2007/0198498 A1 * | 8/2007 | Loftus et al. ....................... 707/3 |
| 2008/0082528 A1 * | 4/2008 | Bonzi et al. ....................... 707/5 |
| 2008/0091708 A1 * | 4/2008 | Caldwell ....................... 707/102 |
| 2008/0102799 A1 | 5/2008 | Dholakia et al. |
| 2008/0104032 A1 | 5/2008 | Sarkar |
| 2008/0154847 A1 * | 6/2008 | Chellapilla et al. ............... 707/3 |
| 2008/0263022 A1 | 10/2008 | Kostorizos et al. |
| 2008/0301281 A1 * | 12/2008 | Wang et al. ................... 709/224 |
| 2009/0006368 A1 * | 1/2009 | Mei et al. ......................... 707/5 |
| 2009/0106202 A1 | 4/2009 | Mizrahi |

* cited by examiner

*Primary Examiner* — Son T Hoang

(74) *Attorney, Agent, or Firm* — Fenwick & West LLP

(57) ABSTRACT

A system, a method, and various software tools enable a video hosting website to automatically identify posted video items that contain spam in the metadata associated with a respective video item. A spam detection tool for user-generated video items based on appearance in popular queries is provided that facilitates the detection of spam in the metadata associated with a video item.

9 Claims, 3 Drawing Sheets

SPAM DETECTION FOR USER-GENERATED MULTIMEDIA ITEMS BASED ON APPEARANCE IN POPULAR QUERIES

CROSS REFERENCE TO RELATED APPLICATIONS

This application is related to U.S. patent application Ser. No. 12/015,986, filed Jan. 17, 2008, and titled "Spam Detection for User-Generated Multimedia Items Based on Keyword Stuffing."

This application is related to U.S. patent application Ser. No. 12/059,135, filed Mar. 31, 2008, and titled "Spam Detection for User-Generated Multimedia Items Based on Concept Clustering."

BACKGROUND

1. Field of Art

The present disclosure relates generally to web-based video display and specifically to software tools and methods for spam detection for online user-generated videos.

2. Description of the Related Art

Sharing of video content on websites has become a worldwide phenomenon, supported by dozens of websites. On average, hundreds of thousands of new videos are posted every day to various video hosting websites, and this number is increasing, as the tools and opportunities for capturing video become easy to use and more widespread. Many of these video-hosting websites also provide viewers with the ability to search for a video of interest. It is estimated that in 2006, there were over 30 billion views of user generated video content worldwide.

Users who upload videos onto the video hosting websites are able to add descriptions and keywords (also called tags) related to their video. These descriptions and keywords are stored as metadata associated with the video. The metadata is indexed, and thus allows viewers to search for videos of interest by entering keywords and phrases into a search engine on the video hosting website. Some users attempt to intentionally misrepresent the content of their video, so that their videos appear more often in the search results, and thus are seen by more viewers. These users employ various methods—sometimes called "spamdexing" or "keyword stuffing"—to manipulate the relevancy or prominence of their video in the search results, for example, by stuffing their descriptions with popular words or phrase in order to target these popular queries. This results in making it more difficult for viewers to find videos that actually related to the viewer's interests, as expressed in their keyword searches.

SUMMARY

A system, a method, and various software tools enable a video hosting website to automatically identify posted video items that contain spam in the metadata associated with a respective video item. A spam detection tool for user-generated video items is provided that facilitates the detection of spam in the metadata associated with a video item.

In one embodiment, a video item, along with its associated metadata, is stored in a video database. The metadata is examined and a number of unique words in the metadata associated with a video item is determined. If the number of unique words exceeds a predetermined threshold, the video item is removed from the video database. Alternately, the video item remains and portions of metadata identified as spam are used to adjust ranking.

In another embodiment, a video item is stored in a video database and the metadata associated with the video items is processed by a concept clustering algorithm to determine the number of concepts in the associated metadata. The determination of whether the item contains spam is based on the number of concepts contained in the metadata. Additionally, the determination of whether the item contains spam can be based on the combination of unrelated concepts contained in the metadata.

In another embodiment, a video item is stored in a video database and a process determines how many times the video item appears as a search result in the most frequent search queries received by the video hosting site. A set of most frequent search queries is established. The frequency of the appearance of the video item as a result of the set of top queries is also determined. When the number or frequency of instances of a given video item exceeds a predetermined threshold, the video item is removed from the video database. Alternately, the video item remains and portions of metadata identified as spam are used to adjust ranking.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the present invention for purposes of illustration only. One skilled in the art will readily recognize from the following discussion that alternative embodiments of the instructions and methods illustrated herein may be employed without departing from the principles of the invention described herein.

DETAILED DESCRIPTION

It is to be understood that the figures and descriptions of the present invention have been simplified to illustrate elements that are relevant for a clear understanding of the present invention, while eliminating, for the purpose of clarity, many other elements found in typical communication system and method of using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Figure 1:
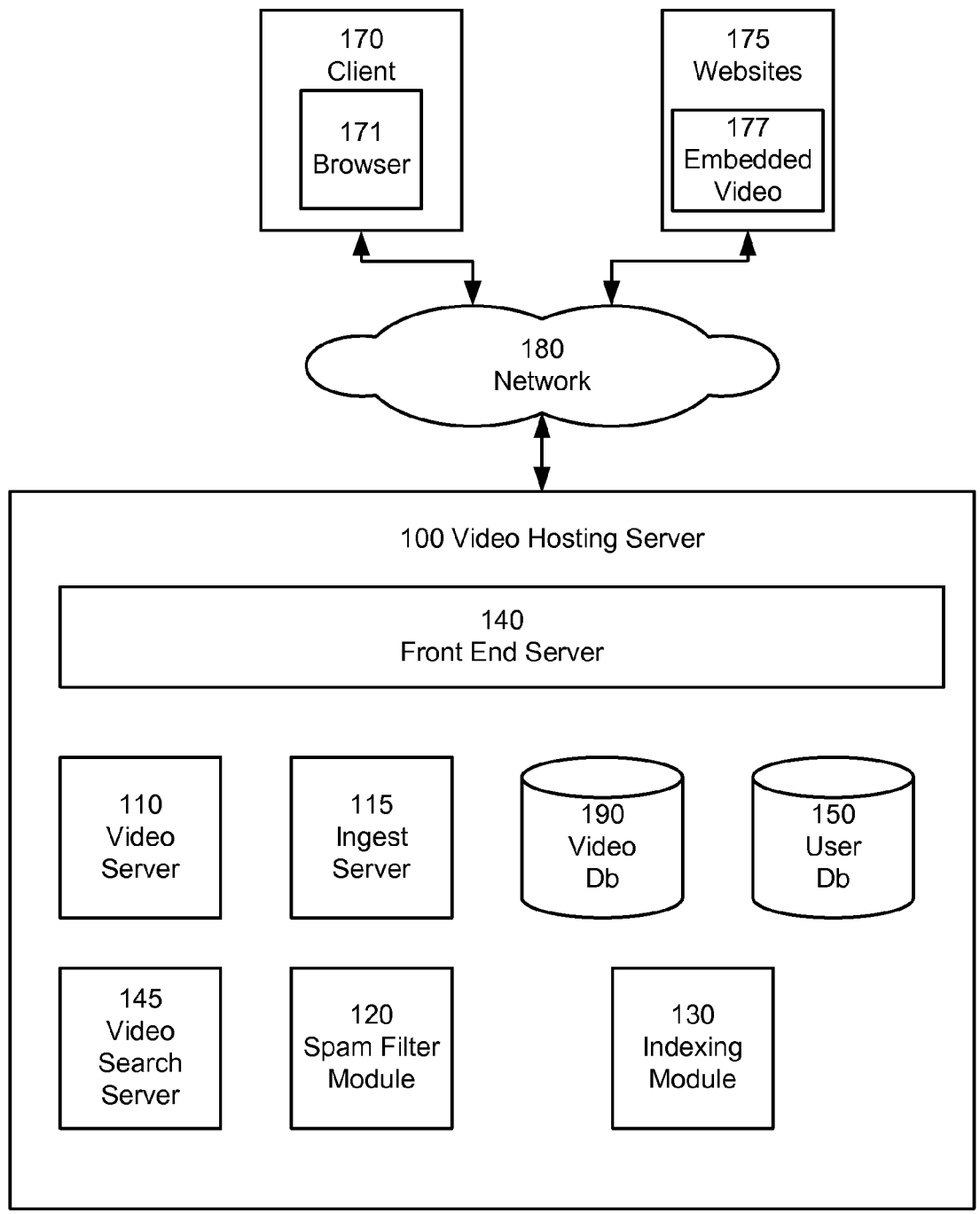
FIG. 1 is a block diagram of a system architecture for providing spam detection for uploaded video content in accordance with one embodiment.

FIG. 1 is a block diagram of a system architecture in accordance with one embodiment of the present invention. As shown in FIG. 1, a video hosting server 100 includes a front end server 140, a video search server 145, a user database 150, a video server 110, an ingest server 115, a video database 190, a spam filter module 120, and an indexing server 130. Many conventional features, such as firewalls, load balancers, application servers, failover servers, site management tools, and so forth are not shown so as not obscure the features of the system. A suitable server 100 for implementation of the system is a server or servers of the YOUTUBE™ website, found at www.youtube.com; other video hosting sites are known as well, and can be adapted to operate according the teaching disclosed herein. It will be understood that the terms "web site" and "server" represent any method of uploading and downloading content and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

Each of the various servers is implemented as server program executing on server-class computer comprising a CPU, memory, network interface, peripheral interfaces, and other well known components. The computers themselves preferably run an open-source operating system such as LINUX, have generally high performance CPUs, 1 G or more of memory, and 100 G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media).

A client 170 executes a browser 171, and can connect to the front end server 140 via a network 180, which is typically the Internet, but may also be any network, including but not limited to any combination of a LAN, a MAN, a WAN, a mobile, wired or wireless network, a private network, or a virtual private network. While only a single client 170 and browser 171 are shown, it is understood that very large numbers (e.g., millions) of clients are supported and can be in communication with the website 100 at any time. The browser 171 can include a video player (e.g., Flash™ from Adobe Systems, Inc.), or any other player adapted for the video file formats used in the site 100. A user can access a video from the site 100 by browsing a catalog of videos, conducting searches on keywords, reviewing playlists from other users or the system administrator (e.g., collections of videos forming channels), or viewing videos associated with particular user group (e.g., communities). A browser 171 can also access a video file indirectly, via an embedded video 177 that is accessed via an embedded hyperlink in a third party website 175.

Users of clients 170 can also search for videos based on keywords, tags or other metadata. These requests are received as queries by the front end server 140 and provided to the video search server 145, which then searches the video database 190 for videos that satisfy the queries. The video search server 145 supports searching on any fielded data for a video, including its title, description, tags, author, category, and so forth.

Users of the client 170 and browser 171 can upload content (which can include, for example, video, audio, or a combination of video and audio) to site 100 via network 180. The uploaded content is processed by an ingest server 115, which processes the video for storage in the video database 190. This processing can include format conversion (transcoding), compression, metadata tagging, and other data processing. An uploaded content file is associated with the uploading user, and so the user's account record is updated in the user database 150 as needed.

For purposes of convenience and the description of one embodiment, the uploaded content will be referred to a "videos", "video files", or "video items", but no limitation on the types of content that can be uploaded are intended by this terminology. Each uploaded video is assigned a video identifier (id) when it is processed by the ingest server 115.

The video database 190 is used to store the ingested videos. The video database 190 stores video content and associated metadata, provided by their respective content owners. The audio files are can be encoded at .mp3 files at 64 kbps, mono, 22.1 KHz, or better quality (e.g., 128 kbps, stereo, 44.2 KHz). The metadata for each audio files includes an ISRC (or custom identifier), artist, song title, album, label, genre, time length, and optionally geo-restrictions that can be used for data collection or content blocking on a geographic basis.

The spam filter module 120 processes metadata associated with each video stored in the video database 190. Metadata associated with each stored video is analyzed in order to determine whether the video and/or its related description contains spam. Various methods to detect spam are further described below. In some embodiments, the spam filter module 120 is part of the indexing server 130 and prepares the data for a given video to be uploaded.

The indexing server 130 indexes the video and its metadata into an index. In some embodiments, to the indexing server 130 acts with the spam filter module 120 to check for spam in the metadata of the video. In some embodiments, the ingest server 115 acts with the spam filter module to check for spam in the metadata of the video.

Figure 2:
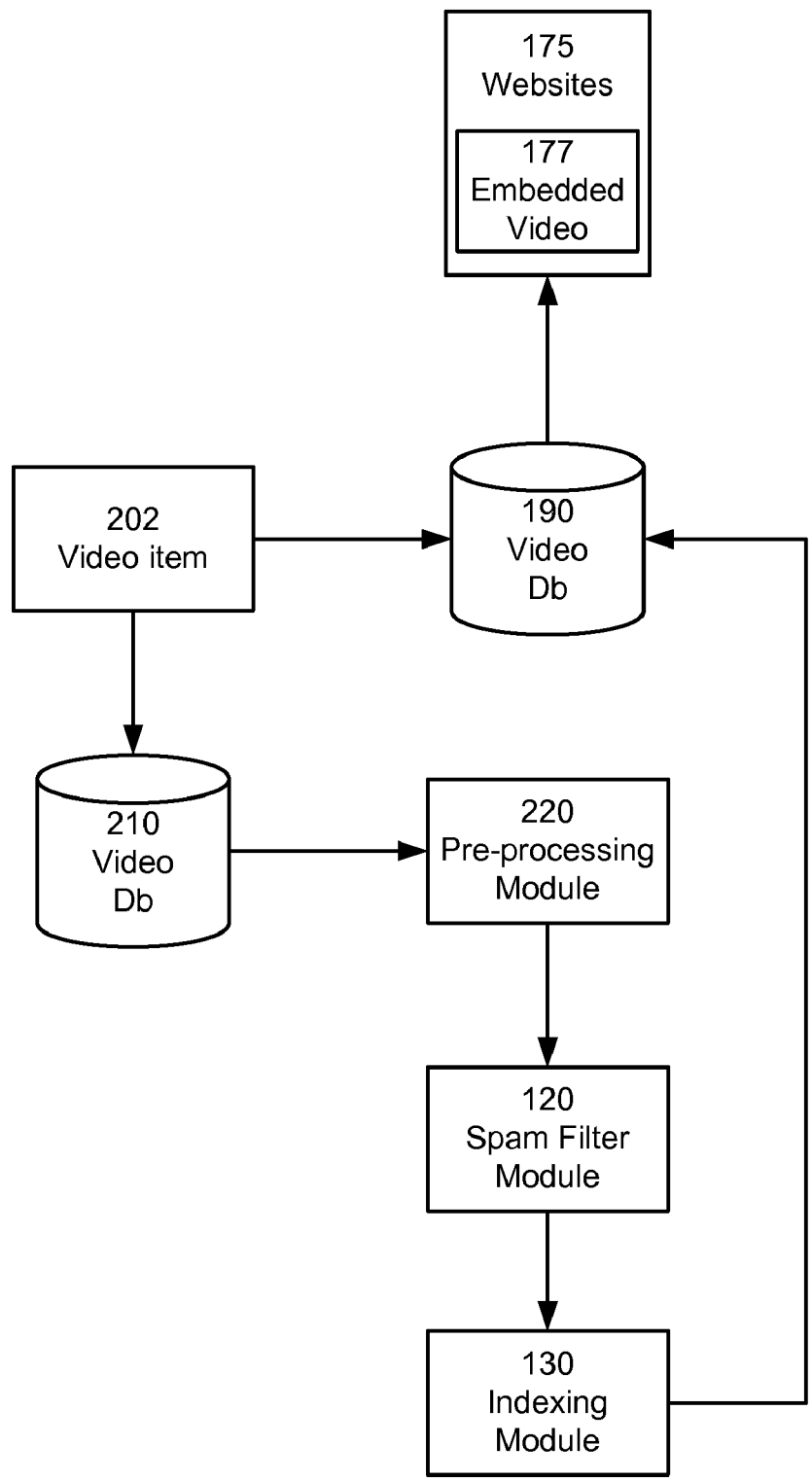
FIG. 2 is a flowchart illustrating a method of processing video items to be displayed on a video hosting website in accordance with one embodiment.

FIG. 2 is a data flow diagram illustrating a method of processing video items uploaded to a video hosting website in accordance with one embodiment. A video item 202 is uploaded by a user on a video hosting website. The video item 202 contains video content and associated metadata, such as a description of the video content, tags, keywords or phrases, and tokens. The video item 202 and its related metadata is uploaded into a video database 190.

In some embodiments, as shown in FIG. 2, the video item 202 can also stored in a second video database 210 to be processed for spam detection. The video is pre-processed and the associated metadata is processed, wherein the tags, description, title, and other information associated with the video and included in the metadata is combined 220. The metadata is processed for the presence of spam by the spam filter module 120. If it is determined that the video item's metadata contains spam, the video may be removed from the video database 190. If it is determined that the video item is free of spam, the video is indexed 130. In some embodiments, if it is determined that the video item contains spam, the video is marked for removal at a later time. In some embodiments, if it is determined that the video item contains spam, the portion(s) of metadata identified as spam are recorded.

In other embodiments, the method includes an indexing server 130 that indexes the video and its metadata. In some embodiments, the spam detection process is performed at the time of indexing. In such embodiments, the spam filter module 120 is part of the indexing server 130 and is processed for the presence of spam content before being stored in the video database 190. As shown in FIG. 2, in one embodiment, a video item is initially stored in video database 190, but is removed if the video's metadata is later determined to contain spam. In other embodiments, the video item is not added to the video database, and is not available for viewing, until it has been checked for spam. In other embodiments, the video item is first added to the index and made available for viewing and is later checked for spam. This situation occurs, for example, when existing videos on a video viewing website are spam-checked after the are made available.

Figure 3:
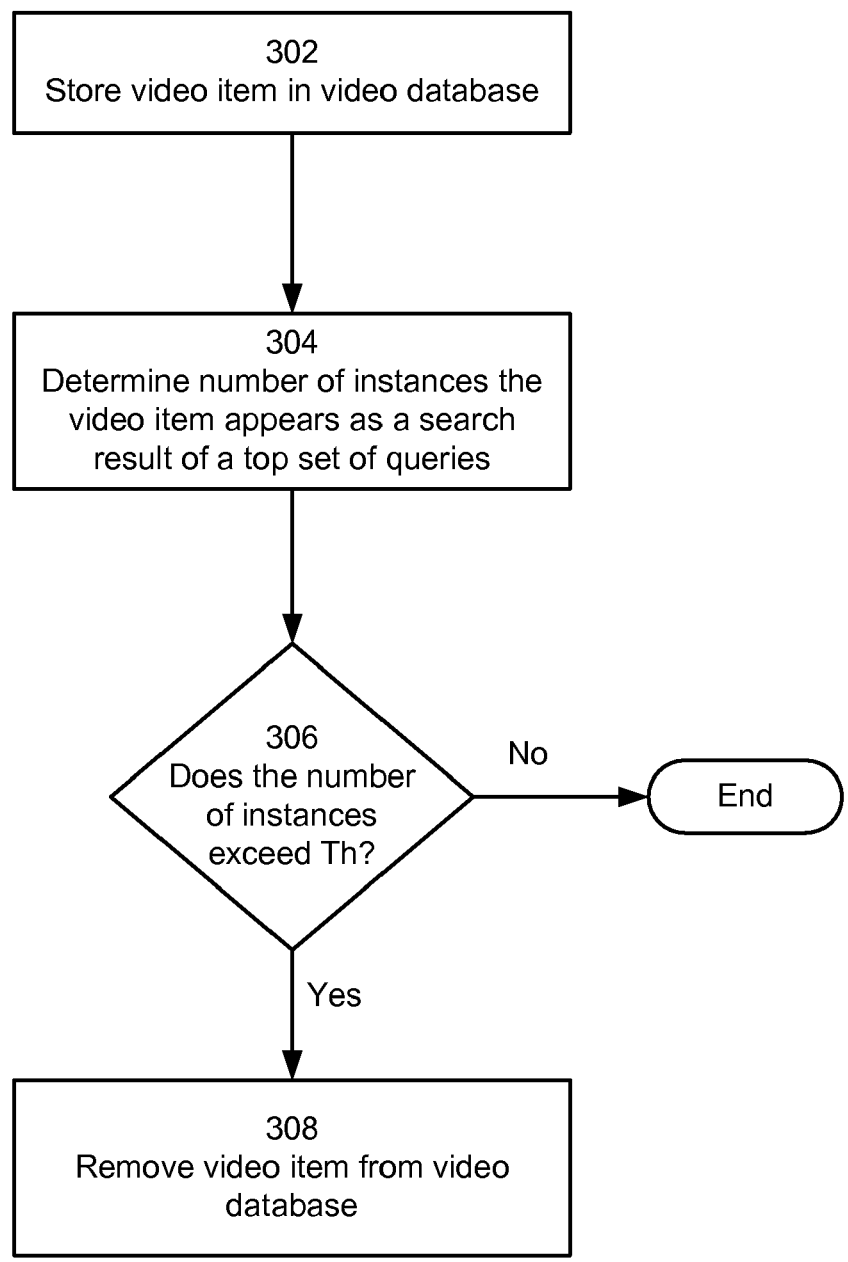
FIG. 3 is a block diagram illustrating a process for detecting spam on user-generated videos in accordance with one embodiment.

FIG. 3 is a block diagram illustrating a process for detecting spam on user-generated videos in accordance one embodiment. As a prior condition, some number of video items are stored in the video database being operated upon (either database 190 or 210). Accordingly, the metadata for a video item is stored 302 in the database. The video item includes metadata data such as a description of the video item, which may further include one or more tokens, keywords, key phrases or tags.

For a given video item, the process looks at a set of most frequently made queries and determines a number of instances that the video appears in a search result for the top set 304 of queries. In other words, the process determines how many times the video would be a "hit" in the most frequent queries made on the video hosting website. If the number of instances exceeds a predetermined threshold (306—Yes), then the video item is removed from the video database 308 (or marked for subsequent removal). In one embodiment, the threshold is determined as discussed in the following paragraph.

The most frequent queries for a given period (e.g., current week or month) can be determined from the query logs of the video search server 145. From these logs, a set of the most frequent, e.g., 10,000 most frequent, queries can be identified. In some embodiments, the most frequent queries for a given week are determined from the query logs of the video search server 145. In other embodiments, the most frequent queries for a given month are determined from the query logs of the video search server 145. The results of these queries can be accumulated with respect to the video items, so as to determine the number of times a video item appears in the search results for a set of popular queries. For example, the results of the 10,000 most frequent queries may be analyzed to determine which video items appears most often. Some videos may appear only a few times as a result of the most frequent queries, while others may appear hundreds or thousands of times as a result of the most frequent queries. The average number of appearances ("hits") for all of these video items, as well as the distribution of appearances can then be determined for a given set of queries. The threshold for identifying a spam video item can then be set based on this average number of hits per video per a given set of queries, for example as multiple of this value the average number of hits per video or some number of standard deviations above the average, or some particular percentile (e.g., $90^{th}$) in the distribution.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method of identifying spam in a collection of multimedia videos, comprising:
   storing the collection of videos;
   establishing a set of top queries for the videos in the collection and identifying results of each query in the set of top queries, wherein the set of top queries comprises a set of at least ten thousand frequently made queries for the videos in the collection, and wherein the results of the set of top queries comprise one or more of the videos from the collection;
   for a video in the collection, counting a number of times that the video appears in the results of the set of top queries; and
   responsive to the number of times that the video appears in the results of the set of top queries exceeding a predetermined threshold, marking the video as spam.

2. The computer-implemented method of claim 1, further comprising, responsive to the video being marked as spam, removing the video from the collection.

3. The computer-implemented method of claim 1, further comprising, responsive to the video being marked as spam, removing the video from an index.

4. A system, comprising:
   a computer processor;
   a non-transitory computer-readable storage medium storing computer program code, comprising:
      means for storing a collection of videos;
      means for establishing a set of top queries for the videos in the collection and identifying results of each query in the set of top queries, wherein the set of top queries comprises a set of at least ten thousand frequently made queries for the videos in the collection, and wherein the results of the set of top queries comprise one or more of the videos from the collection;
      means for counting a number of times a video in the collection appears in the results of the set of top queries; and
      means for marking the video as spam, the means for marking responsive to the number of times that the video appears in the results of the set of top queries exceeding a predetermined threshold.

5. The system of claim 4, wherein the storage medium further comprises means for removing the video from the collection, responsive to the video being marked as spam.

6. The system of claim 4, wherein the storage medium further comprises means for removing the video from an index, responsive to the video being marked as spam.

7. A non-transitory computer-readable storage medium, comprising computer program code for:
   storing a collection of videos;
   establishing a set of top queries for the videos in the collection and identifying results of each query in the set of top queries, wherein the set of top queries comprises a set of at least ten thousand frequently made queries for the videos in the collection, and wherein the results of the set of top queries comprise one or more of the videos from the collection;
   for a video in the collection, counting a number of times that the video appears in the results of the set of top queries; and
   responsive to the number of times that the video appears in the results of the set of top queries exceeding a predetermined threshold, marking the video as spam.

8. The non-transitory computer-readable storage medium of claim 7, further comprising computer program code for removing the video from the collection, responsive to the video being marked as spam.

9. The non-transitory computer-readable storage medium of claim 7, further comprising computer program code for removing the video from an index, responsive to the video being marked as spam.

* * * * *